United States Patent [19]

Andersson

[11] Patent Number: 5,671,785
[45] Date of Patent: Sep. 30, 1997

[54] GASOLINE DISPENSING AND VAPOR RECOVERY SYSTEM AND METHOD

[75] Inventor: Bo Göran Andersson, Salisbury, Md.

[73] Assignee: Dresser Industries, Inc., Dallas, Tex.

[21] Appl. No.: 645,777

[22] Filed: May 13, 1996

Related U.S. Application Data

[63] Continuation-in-part of Ser. No. 515,484, Aug. 15, 1995.
[51] Int. Cl.$^6$ .................................................. B65B 31/00
[52] U.S. Cl. ................... 141/59; 141/4; 141/45; 141/47; 141/104; 141/285; 141/302
[58] Field of Search .................. 141/5, 7, 44, 45, 141/47, 59, 52, 83, 95, 290, 104, 105, 186, 196, 285, 302

[56] References Cited

U.S. PATENT DOCUMENTS 5,484,000   1/1996   Hasselmann ........................ 141/59

*Primary Examiner*—Henry J. Recla
*Assistant Examiner*—Timothy L. Maust
*Attorney, Agent, or Firm*—Haynes and Boone, L.L.P.

[57] ABSTRACT

A gasoline vapor recovery system and method in which a mixture of air and gasoline vapor is passed from a vehicle tank to a storage tank during the dispensing of gasoline from the storage tank to the vehicle tank. A portion of the mixture of air and gasoline vapor is vented from the storage tank, the flow and/or the vapor concentration of the vented mixture from the storage tank are determined, and the mixture flow from the vehicle tank is varied accordingly.

27 Claims, 5 Drawing Sheets

GASOLINE DISPENSING AND VAPOR RECOVERY SYSTEM AND METHOD

CROSS REFERENCE TO RELATED APPLICATION

This application is a continuation-in-part of pending application Ser. No. 08/515,484, filed on Aug. 15, 1995.

BACKGROUND OF THE INVENTION

This invention relates to a gasoline dispensing and vapor recovery system and method and, more particularly, to such a system and method for controlling the flow of vapor from a container as it is being filled with gasoline.

The need for controlling the flow of vapor from a container, such as a vehicle tank, as gasoline is dispensed into the container is well known. For example, a number of systems and methods have been proposed for controlling the flow of a mixture of air and hydrocarbon vapors (hereinafter referred to as "vapor/air mixture") displaced from a vehicle tank during refueling of the vehicle at a service station, or the like.

Previous gasoline dispensing and vapor recovery systems and methods of this type have included a plurality of dispensing nozzles at each dispensing area of the dispensing, or service, station, with each nozzle being adapted to dispense a different grade of gasoline. Passages are provided in each nozzle for collecting the vapor/air mixture from the fuel tank, and a return line communicates the vapor/air mixture passage for delivering the collected vapor/air mixture to the underground fuel storage tank. Although these designs have been generally successful in recovering a portion of the vapor/air mixture, they are not without problems.

For example, some of the earlier systems and methods relied solely upon vapor/air mixture pressure within the fuel tank to force the vapor/air mixture through the vapor/air mixture return line. However, due to pressure losses and partial obstructions in the vapor/air mixture recovery line (sometimes caused by fuel splash back or condensation), the vapor/air mixture pressure developed in the vehicle fuel tank was often insufficient to force the vapor/air mixture out of the vehicle tank and to the underground storage tank.

Other, more recent, vapor recovery systems employ a vacuum pump for drawing the vapor/air mixture from the vehicle tank and through a vapor/air mixture return line. To avoid the expense of a separate vacuum pump at each dispensing station, such systems have typically resorted to a powerful, continuously-operating vacuum pump and a complicated arrangement of electrically actuated valves for connecting the various vapor/air mixture return lines to the vacuum pump when the various pumps were actuated for dispensing. Acceptance of these designs has been minimal because of the expense and difficulty of both installation and maintenance. Additionally, since they typically draw such a large volume of ambient air relative to the volume of fuel vapor/air mixture, there is a danger of an explosive mixture being formed.

Also, it has been suggested that each dispensing unit include a vacuum pump driven by the dispensing unit's conventional gasoline flow meter and connected to a vapor/air mixture return line. However, this type of apparatus is limited to a linear relationship between gas flow and vapor/air mixture flow, which relationship is not always optimum, since the vapor/air mixture concentration in the return line is dependent on several parameters such as nozzle design, vehicle fill pipe design, weather conditions, wind, vehicle fuel tank temperature, fuel temperature, atmospheric pressure, etc. In apparatus designed to correct for this, a valve has been provided which is controlled by electronics that respond to the gasoline and the vapor/air mixture flow and establish an optimum relationship therebetween. However, this requires a metering device and a control valve for each dispensing nozzle, which is expensive and results in an unduly complicated apparatus. Moreover, in the latter arrangements, the vapor/air mixture metering device is disposed downstream of its associated control valve. Therefore, when the vapor/air mixture expands after leaving the control valve, it causes the operation of the metering device to be less than optimum.

Also, in a majority of the vapor recovery systems and methods discussed above, the efficiency of the system is determined by the volume of vapor recovered from the dispensers in relation to the volume of fuel transferred from the underground storage tank to the vehicle(s), less any losses that may occur. More particularly, the ratio of the volume of recovered vapor (V) to the volume of dispensed fuel (F) should be as high as possible without pressurizing the underground storage tank and thus causing the discharge of the mixture of vapor and air from the tank through its vent pipe.

However, in these prior art systems, a standard vent pipe is provided in connection with the underground storage tank and the vapor recovery is controlled in the limited manners discussed above to eliminate over pressurizing the storage tank. This is less than satisfactory since, depending on the temperature differences between the storage tank and the recovered vapors, and the saturation of the recovered vapors, pressurization of, and venting from, the storage tank can still occur which considerably reduces the efficiency of the system and pollutes the atmosphere. Also, the oxygen content of the mixture in the storage tank can become relatively high under certain conditions, such as when the vapor recovery is compromised due to a poor vehicle/nozzle interface, when the vehicle is equipped with an onboard vapor recovery system, when the temperature is relative low, and the like. Of course, if the oxygen content is too high, the mixture will be explosive, creating an extremely hazardous condition.

SUMMARY OF THE INVENTION

The system and method of the present invention enable the V/F ratio to be maximized and losses from the underground storage tank to be minimized. To this end, the flow and/or the vapor concentration of the air/vapor mixture venting from the underground storage tank are determined and corresponding output signals are produced. The output signals are sent to one or more units for controlling the vapor recovery from the vehicle tanks, and the V/F ratio is adjusted accordingly so that vapor discharge from the underground storage tank is eliminated or, at least, reduced to a minimal amount.

As a result, the system operates at increased efficiency, pollution is minimized, and hazardous conditions are eliminated.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein.

DESCRIPTION OF THE PREFERRED EMBODIMENT

Figure 1:
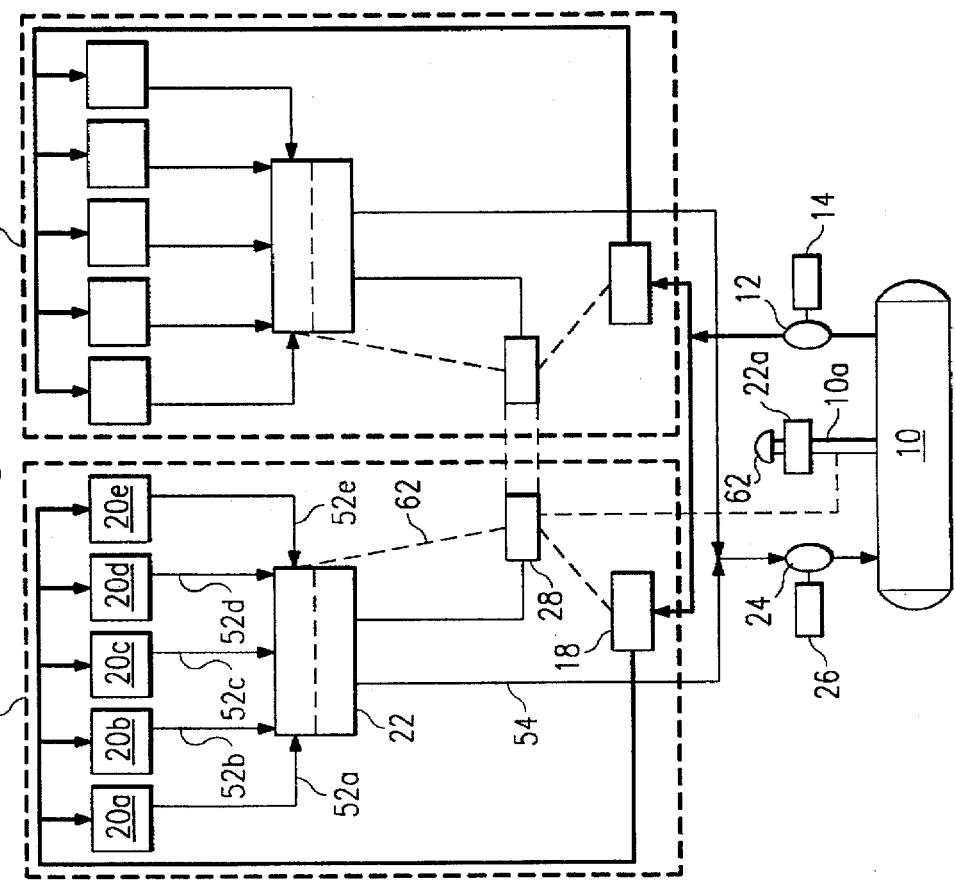
FIG. 1 is a schematic view of the system of the present invention.

Referring to FIG. 1 of the drawings, the fluid control apparatus and method of the present invention will be described, by way of example, in connection with a gasoline dispensing and vapor recovery system at a vehicle service station. The reference numeral 10 refers to an underground gasoline storage tank, which is connected by a suitable conduit to a pump 12 driven by a motor 14 for pumping the gasoline to two dispensing stations 16a and 16b respectively represented by the dashed lines in the drawing. Since the stations 16a and 16b are identical, only the station 16a will be described in detail. A gasoline flow meter 18 receives the gasoline from the pump 12 and generates an output signal in proportion to the gasoline flow, for reasons to be described.

The dispensing station 16a includes five dispensing units 20a–20e for five different types, or grades, of gasoline and since the units are conventional, they are shown only schematically in the drawing. It is understood that each unit 20a–20e includes a dispenser housing for containing the necessary gasoline dispensing and vapor recovery components, including those to be described. Also, a blending chamber or valve can be included to regulate the volumetric ratio of relative low octane products, such as unleaded regular, and relatively high octane products, such as unleaded premium, so as to make available multiple grades of fuel. In this context, although only one storage tank 10 is shown in the drawings, it is understood that two or more tanks would be provided, each containing a different grade or type of fuel, and that proper valving would be included to pass the two or more fuels to the above-mentioned blending chamber or valve. This blending technique does not form a part of the present invention and is disclosed in U.S. Pat. Nos. 3,424,348; 3,838,797 and U.S. Pat. No. 4,049,159, all of which are hereby incorporated by reference.

Although not shown in the drawings, it is understood that each unit 20a–20e also includes a hose and nozzle assembly which includes a twin hose arrangement of either two separate hoses or a coaxial arrangement in which inner and outer hoses are connected to a single dispensing nozzle for dispensing the blended product through one of the hoses and for receiving a vapor/air mixture from the vehicle tank in the other hose, as will be described.

The station 16a also includes a meter/valve assembly 22 which is selectively connected to each of the units 20a–20e. As will be described in detail later, the assembly 22 includes a valve unit and a member which cooperate with the valve unit to control the fluid flow through the assembly and which contains a flowmeter. The vapor/air mixture is forced from the vehicle tank by the gasoline entering the tank and passes through the vapor/air mixture recovery hose associated with the selected unit 20a–20e, and through the assembly 22. A vacuum pump 24 is connected between the assembly 22 and the storage tank 10 for assisting in returning the captured vapor/air mixture to the tank. The pump 24 is conventional and is driven by a motor 26.

It is understood that suitable piping, conduits, valves, and the like, can be provided to accommodate the above described gasoline flow, which is shown by the relatively heavy lines in FIG. 1, and the vapor/air mixture flow, shown by the relative light lines.

A control unit 28 is provided in association with both of the stations 16a and 16b, receives electrical input signals from the gasoline flow meter 18 and from the assembly 22, and generates an output signal which is transmitted to the valve portion of the assembly 22 to operate the assembly, all in a manner to be described. The electrical connections between the control unit 28 and the flow meter 18 and the assembly 22 are shown by dashed lines in the drawing.

It should be emphasized that since FIG. 1 is merely a schematic representation of the basic components of the assembly of the present invention, the exact location of the components can vary within the scope of the invention. For example, the vapor/air mixture pump 24 and the motor 26 are not necessarily located close to the storage tank 10 but could be located in the dispensing station 16a.

Figure 2:
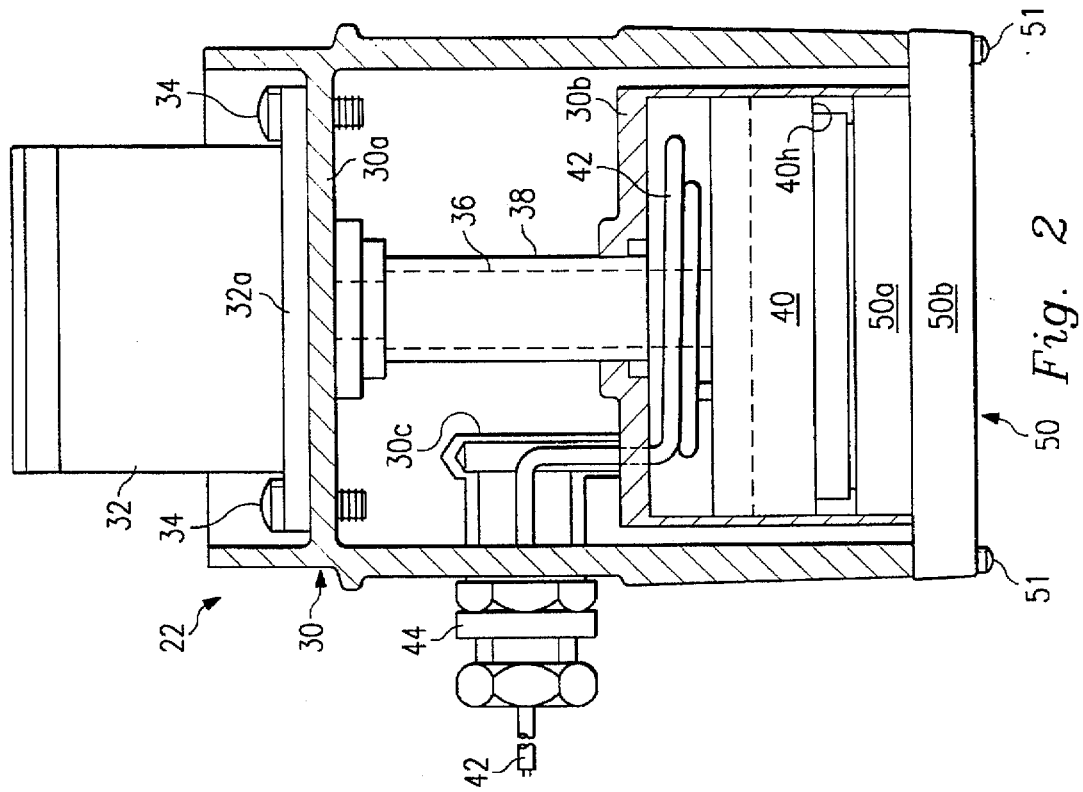
FIG. 2 is a sectional view of a meter/valve assembly forming a portion of the system of FIG. 1.

The meter/valve assembly 22 is shown in FIG. 2 and includes a housing 30 having a platform 30a formed therein. A stepper motor 32 extends through the top of the housing 30, has a base portion 32a which rests on the platform 30a and is attached to the housing by four threaded bolts, two of which are shown by the reference numeral 34. A drive shaft 36 extends downwardly from the motor 32, as viewed in FIG. 2, and through the upper wall of a subhousing 30b formed in the lower portion of the housing 30. The drive shaft 36 extends within, and is supported by, a tubular support member 38 which also extends from the motor 32 and through the upper wall of the subhousing 30b.

A disc-like, body member 40, having a stepped outer diameter, is disposed in the subhousing 30b. The distal end of the output shaft 36 is connected to the center portion of the member 40 and a planetary gear, or the like (not shown), is provided for rotating the drive shaft 36 in response to actuation of the motor 32 in a conventional manner, with this rotation causing corresponding rotation of the member 40.

An electrical signal-conducting cable 42 extends from the member 40, through the upper wall of the subhousing 30b, through a molded conduit 30c formed in the housing 30 and through the wall of the latter housing. A stress-relieving nut assembly 44 is provided on the outer portion of the wall of the housing 30 which receives and protects the cable 42. The cable 42 is connected to the control unit 28 (FIG. 1) and includes two or more conductors (not shown) to pass signals relating to flow and density of the fluid to the control unit 28 for reasons to be described. Although not shown in the drawings it is understood that an electrical signal-conducting cable also connects the output of the control unit 28 to the motor 32 to drive the motor as also will be described.

A disc-like valve unit 50 is disposed in the subhousing 30b immediately below, and in a coaxial relationship with, the member 40. The unit 50 has an enlarged base portion 50b which is affixed to the lower end of the housing 30 by a series of bolts 51 (two of which are shown in FIG. 2) which extend through aligned openings in the base portion 50b and the housing 30. Thus, the member 40 rotates relative to the fixed valve unit 50 with the arrangement being such that this rotation controls the flow of fluid through the assembly 22 in a manner to be described.

Figure 3:
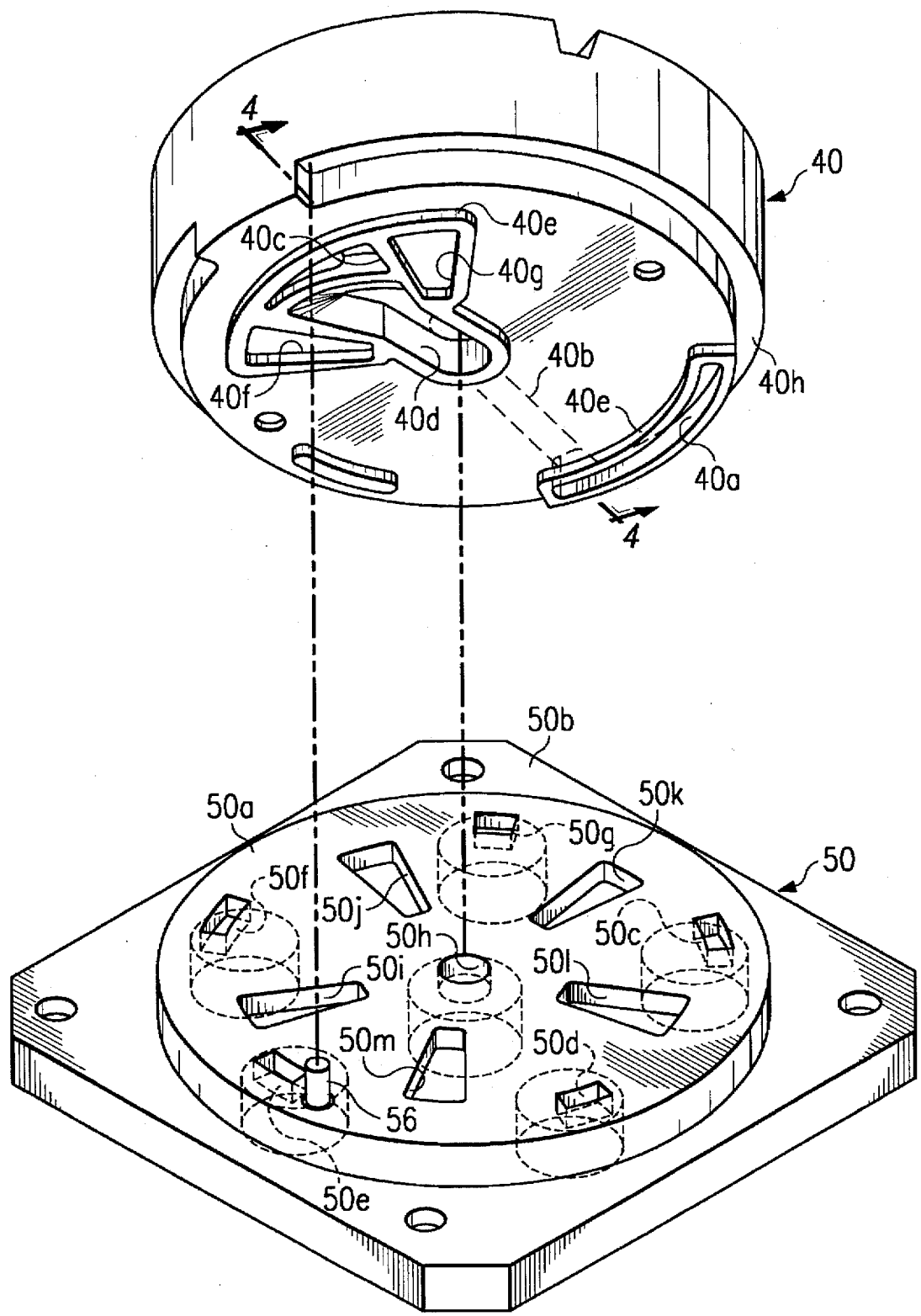
FIG. 3 is an exploded, perspective view of the meter/valve assembly of FIG. 2.

FIG. 3 better depicts the relationship between the member 40 and the valve unit 50. More particularly, the valve unit 50 has a series of five through ports 50c–50g which extend through the body member 50 and which serve as inlets. The inlet ports 50c–50g are angularly spaced around the body member 50a and, as shown in FIG. 1, are connected to the dispensing units 20a–20e, respectively, by five tubes 52a–52e, which, in turn, are connected to, or form a portion of, the vapor/air mixture recovery hoses (not shown) respectively associated with the above-mentioned hose and nozzle assemblies of the units 20a–20e.

Referring to FIG. 3, each inlet port 50c–50g extends from the lower surface of the body member 50a, where the port is circular in cross section, to the upper surface of the body member 50a where the port is rectangular in cross section. A through opening 50h extends through the center of the body member 50a and serves as an outlet. The outlet opening 50h is circular in cross section with its diameter being relative large at the lower surface of the body member 50a and relatively small at its upper surface, and is connected, via a tube 54 (FIG. 1), to the inlet of the vapor/air mixture pump 24. A series of pie-shaped slots 50i–50m are also formed in the upper surface of the unit 50 and are angularly spaced around the opening 50h. The slots 50i–50m function in tandem with the ports 50c–50g, respectively to allow the vapor/air mixture to flow through the member 40 as will be described.

As also shown in FIG. 3, an arcuate inlet slot 40a is provided in the lower surface of the metering member 40 near its outer periphery and is adapted to selectively align with one of the inlet ports 50c–50g of the valve unit 50 when the units are in their assembled condition and when the assembly is operating. An extended opening is formed at one end portion of the inlet slot 40a and registers with one end of a passage 40b formed in the interior of the member 40 and extending to an extended opening formed in a pie-shaped slot 40c formed on the lower surface of the metering member 40. An elongated slot 40d is also formed on the lower surface of the metering member 40 which has one end portion slightly spaced from the slot 40c, with the remaining portion of the slot 40d extending toward the center of the member 40. The other end of the slot 40d registers with the outlet opening 50h of the valve unit 50 when the units 40 and 50 are in their assembled condition.

A series of ramps 40e is formed on the lower surface of the member 40 and extends around the slots 40a, 40c and 40d. Also, additional ramps 40e are provided which define two wedge-shaped recesses 40f and 40g which extend to the respective sides of the slot 40c. Each of the recesses 40f and 40g are thus separated from the slot 40c by a ramp 40e to prevent leakage as the member 40 rotates relative to the unit 50, as will be described.

A circumferential groove 40h is formed on the outer periphery of the member 40 and receives a pin 56 extending from the upper surface of the unit 50 near the opening 50e. The groove 40h does not extend for the complete circumference of the member 40 and thus has two ends which serve as stops for the pin.

Upon actuation of one of the units 20a–20e of the dispensing station 16a, the basic valving technique made possible by the interaction of the member 40 and the unit 50 involves rotating the member 40 in response to actuation of the motor 32 until the slot 40a aligns with the inlet port 50c–50g corresponding to the selected unit 20a–20e. This allows the flow of vapor/air mixture from the selected unit 20a–20e, through a corresponding tube 52a–52d and to the corresponding inlet port 50c–50g of the unit 50. The vapor/air mixture then flows into the inlet slot 40a of the member 40, through the passage 40b and to the slot 40c. The flow is then allowed to flow over the ramp 40e extending between the slots 40c and 40d and into the latter slot due to the presence of one of the slots 50i–50m extending over the latter ramp and corresponding to the particular inlet port 50c–50g selected. From the slot 40d, the vapor/air mixture flows into and through the outlet opening 50h of the unit 50 from which it exits the meter/valve assembly 22 and passes, via the tube 54, to the vapor/air mixture pump 24 and back to the underground tank 10.

Figure 4:
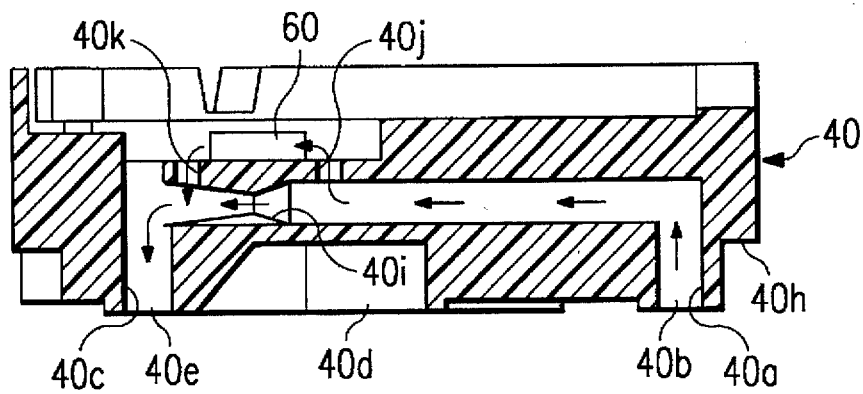
FIG. 4 is a sectional view taken along the line 4—4 of FIG. 3.

The particular structure of the member 40 that forms the above-mentioned passages and slots is better shown in FIG. 4. More particularly, as described above, the vapor/air mixture flows from the vertical extended opening at the end of the slot 40a, through the horizontal passage 40b, and then downwardly through the vertical extended opening of the slot 40c. As shown, the ramp 40e forms a barrier to the flow of vapor/air mixture from the slot 40c to the slot 40d unless one of the slots 50i–50m of the unit 50 (not shown in FIG. 4) extends over the ramp, as will be described.

A fluidic flow metering unit 60, in the form of a negative fluidic feedback oscillator, is disposed in a section of the member 40 extending above the passage 40b, as viewed in FIG. 4, so that the vapor/air mixture flow is metered as it passes through the member. To this end, the downstream portion of the passage 40a is reduced in cross section to form a venturi 40i, and two spaced, through openings 40j and 40k are formed through a common wall of the member 40 extending between the passage 40b and the flow metering unit 60. The openings 40j and 40k extend to either side of the venturi 40i so that a portion of the vapor/air mixture flowing through the passage 40b is diverted into the opening 40j upstream of the venturi 40i and passes through the flow metering unit 60 before returning, through the opening 40k, to the passage 40b at a location downstream of the venturi.

The flow metering unit 60 is a conventional, oscillating-jet flowmeter which produces an output signal having a frequency proportional to the volumetric flow of the vapor/air mixture, and an amplitude proportional to the pressure drop over the flow metering unit 60 and the venturi 40i and its essential components are disclosed in U.S. Pat. No. 4,949,755 and U.S. Pat. No. 5,127,173, the disclosures of which are hereby incorporated by reference. The mass flow of the mixture can then be determined utilizing Bernoulli's equation as will be described and as disclosed in U.S. Pat. No. 4,508,127 the disclosure of which is also hereby incorporated by reference. Since the flow metering unit 60 is conventional, its specific components are not shown in the drawings but will be described briefly as follows. The unit 60 consists of a jet oscillator and a piezo-ceramic transducer. The jet oscillator is in parallel with the nozzle section of the venturi 40i and ejector ports are located at the throat of the venturi where the flow from the oscillator rejoins the venturi flow.

A portion of the vapor/air mixture from the passage 40b passes through the opening 40j and enters the flow metering unit 60 and a portion flows through the fluid oscillator, with the percentage of total flow which flows to the oscillator being determined by the ratio of oscillator nozzle throat area to the throat area of the venturi 40i in the passage 40b. Since this percentage is constant over the operating range of the flow metering unit 60, the oscillator flow rate is an accurate indication of total flow.

The nozzle of the fluid oscillator forms a jet of the vapor/air mixture which is directed across an open area toward the adjacent entrances of two feedback channels. Each feedback channel is connected to side ports which are directly opposed and located immediately downstream of the nozzle exit. Jet velocity is converted to static pressure at the entrance to the feedback channels and the latter are also connected to either side of a piezoceramic transducer that converts differential pressure fluctuations to an alternating voltage signal. As pressure rises in one feedback channel, increasing pressure at the corresponding side port deflects the jet away from the centerline. Pressure then begins to increase in the other feedback channel and the process repeats itself. The jet oscillates between the two feedback channels at a frequency determined by jet velocity and the piezoceramic transducer senses the frequency of the differential pressure fluctuations in the feedback channels and converts them to an electrical output signal. The vapor/air mixture flowing through the oscillator is collected in the open area between the nozzle exit and the feedback channel entrances and is ported back, via the opening 40k to the venturi 40i where it rejoins the main flow in the passage 40b. A large percentage of the pressure drop from the flowmeter inlet to the venturi throat is recovered by the diffuser section of the venturi which minimizes the overall pressure drop of the flowmeter. Thus, the continuous, self-induced oscillation is at a frequency that is proportional to the volumetric flow rate of the vapor/air mixture and at an amplitude that is proportional to the pressure drop over the flow metering unit 60 and the venturi 40i.

It is understood that the member 40 is provided with proper electronics to condition the output signal from the transducer sensor of the jet oscillator described above into two independent scaled pulsed output signals which are transmitted, via the cable 42, to the control unit 28. These output signals correspond to the volumetric flow of the mixture and the pressure drop over the flow metering unit 60 and the venturi 40i, and the control unit 28 measures and calculates the density of the gasoline vapor and the density of the air in the vapor/air mixture, and produces additional corresponding output signals, as will be described.

Referring again to FIG. 1, a pressure relief valve/vent cap 62 and a meter assembly 22a are disposed on the vent pipe 10a of the underground storage tank 10. The pressure relief valve 62 is normally closed, but is adapted to respond to the fluid pressure in the tank exceeding a predetermined value and open to permit the vapor to discharge from the tank until the pressure is reduced below the predetermined value. Since the valve 62 is conventional, it is not shown, nor will it be further described, in any detail.

The meter assembly 22a is disposed on the vent pipe 10a to receive the mixture of vapor and air discharging from the vent pipe 10a as a result of the pressure in the tank exceeding the above-mentioned predetermined value. Preferably, the assembly 22a is identical to the assembly 22 with the exception that it does not contain the valving portion of the assembly 22, as described above. In this context, the assembly 22a would contain the metering member 40, the fluidic flow metering unit 60 and their associated components as discussed above in connection with the assembly 22. Thus, the assembly 22a meters the vapor flow and produces an output signal having a frequency proportional to the volumetric flow (dv/dt), of the vapor, and an amplitude proportional to its pressure drop which enables the amount of gasoline vapor in the mixture discharging from the vent pipe 10a to be calculated in the manner described above. The assembly 22a is electrically connected to the control unit 28 and signals produced by the assembly corresponding to the flow rate and the amount of gasoline vapor in the mixture discharging from the vent pipe 10a are passed to the unit 28.

The operation of the meter/valve assembly 22 will be described with reference to FIGS. 5-8 of the drawings. (Since FIGS. 5-8 are bottom plan views, the various slots and ramps of the member 40 are shown in dashed lines). The assembly 22 is shown in its rest position in FIG. 5 with the pin 56 located at the end of the slot 40h. In this position, although the inlet port 50c of the unit 50 overlaps an end portion of the slot 40a of the member 40, there is no flow since the slot 50i, corresponding to the port 50c, is out of alignment with the slots 40c and 40d.

Figure 5:
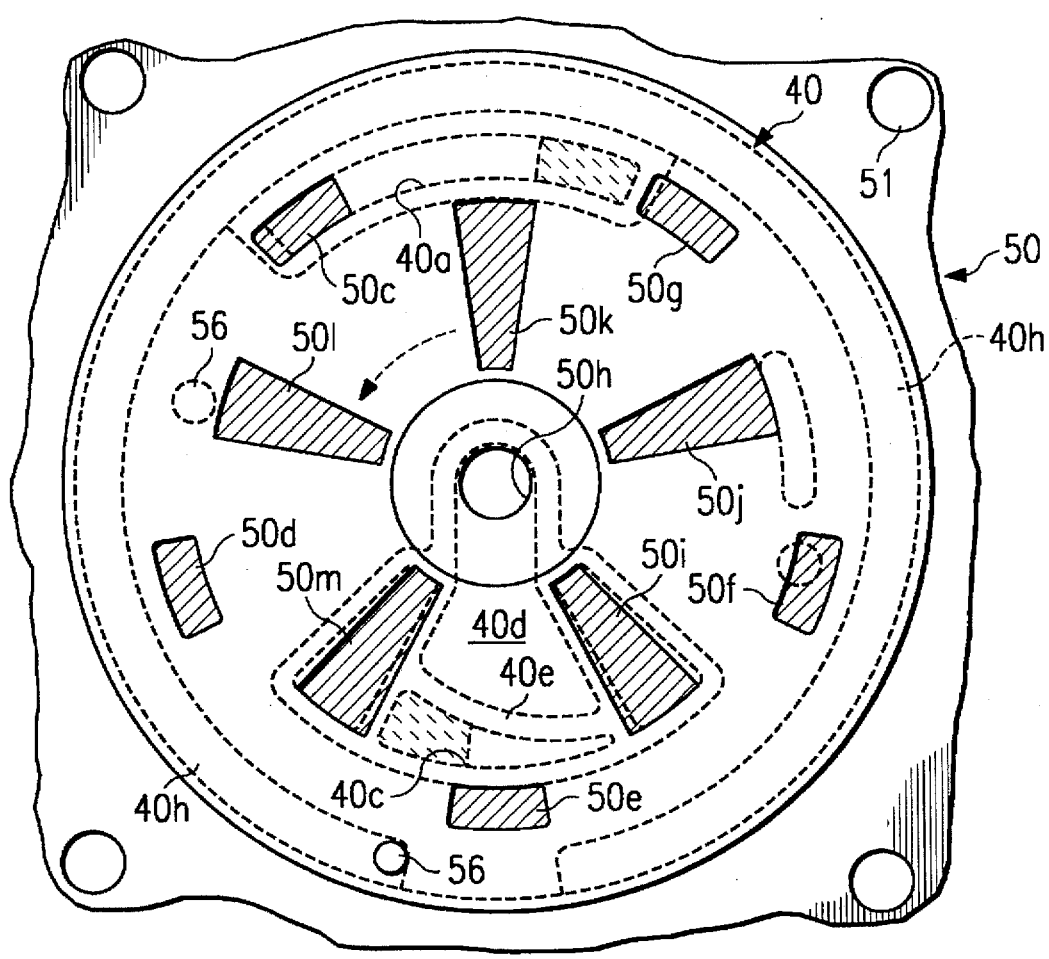
FIGS. 5–8 are bottom plan views depicting different operational modes of the meter/valve assembly of FIG. 2.
Figure 6:
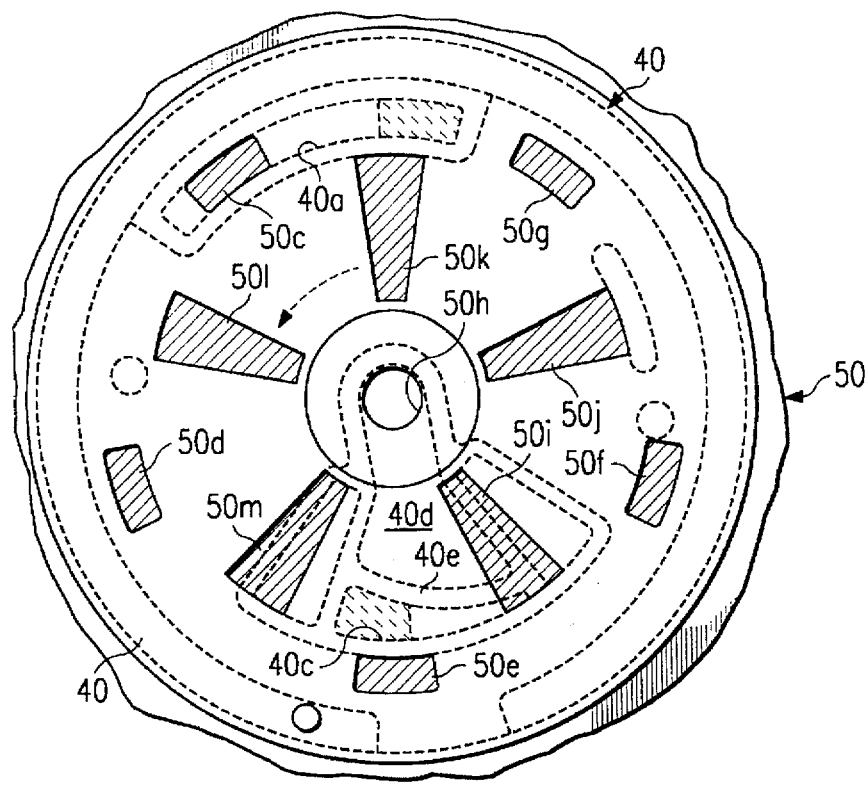

Assuming the dispensing nozzle associated with the unit 20a is lifted off of the dispenser by an operator but before it is actuated by the operator, the control unit 28 actuates the motor 32 to move the member 40 in a counterclockwise relation relative to the unit 50 until the member 40 reaches a position between the positions shown in FIGS. 5 and 6, which is a standby mode. In this position, the slot 50i is out of alignment with the slots 40c and 40d, as well as the ramp 40e, so that the latter ramp thus blocks the flow of any vapor/air mixture remaining in the assembly 22 from the slot 40c to the slot 40d. Upon actuation of the unit 20a (FIG. 1) by the operator, the motor 14 is actuated and the pump 12 pumps gasoline from the tank 10, through the gasoline flow meter 18 and through the dispensing nozzle associated with the unit 20a and into the vehicle tank. The gasoline flow is sensed by the flow meter 18 and a corresponding signal is sent to the control unit 28. A corresponding signal from the control unit 28 is sent to the motor 32 which is actuated to rotate the member 40 in a counterclockwise direction relative to the unit 50, as viewed in FIG. 5, until the member 40 reaches the position relative to the unit 50 as shown in FIG. 6. In this position, the port 50c is fully aligned with the slot 40a and the slot 50i slightly overlaps the slots 40c and 40d and, more particularly, a portion of that portion of the ramp 40e extending between the slots 40c and 40d.

In the meantime, and assuming the vehicle to which the gasoline is being dispensed is not equipped with an onboard refueling vapor recovery system, the gasoline entering the vehicle tank displaces a volume of gasoline vapor/air mixture from the tank which rises to the filler neck of the tank. The motor 26 is actuated to drive the vapor/air mixture pump 24 which assists in drawing the vapor/air mixture from the vehicle tank, and passing it through the vapor/air mixture recovery hose associated with the unit 20a, the tube 52a and to the inlet port 50c of the unit 50. The vapor/air mixture then flows from the port 50c, through the slot 40a, the passage 40b and to the slot 40c. Limited vapor/air mixture flow thus occurs from the slot 40c, across the relatively narrow passage provided by the slot 50i extending over the corresponding portion of the ramp 40e, and to the slot 40d. From the slot 40d, the vapor/air mixture flows through the opening 50h of the unit 50 which registers with the slot 40d and therefore exits the assembly 22 and passes to the pump 24, via the tube 54. During this mode, a portion of the mixture in the passage 40b is diverted through the opening 40j and passes through the flow metering unit 60 before returning to the passage 40b.

The flow metering unit 60 produces an output signal having a frequency proportional to the volumetric flow (dv/dt) of the vapor/air mixture in the vehicle tank, and an amplitude proportional to the pressure drop (dp) over the flow metering unit 60 and the venturi unit 40i, as discussed above. The density of the vapor/air mixture can then be calculated utilizing these signals and applying Bernoulli's equation as follows:

$$dp = density \times (dv/dt)^2 \div 2.$$

Moreover, samples of ambient air in the vicinity of the unit can easily be captured when the slot 40a passes over a port 50c–50f not in use during rotation of the member 40 as described above and the density of the air sample can easily be calculated as a result of it passing across the unit 60 in the manner discussed above. (In this context, it is noted that this sampling of air is possible only when units 20b–20e are actuated and not when unit 20a is actuated. In the latter case, the air density may be set at a predetermined value without severely compromising the accuracy of the signals.) Therefore, the density of the gasoline vapor in the vapor/air mixture passing from the vehicle tank can be determined by subtracting the air density from the density of the mixture.

It is understood that the unit 28 has a microprocessor, or the like, to process these input signals and produce an output signal in accordance with the gasoline flow, the vapor flow and the vapor density as well as possible other preselected parameters discussed above, which output signal is sent to the motor 32 to rotate the member 40, and thus control the vapor/air mixture flow, accordingly.

Figure 7:
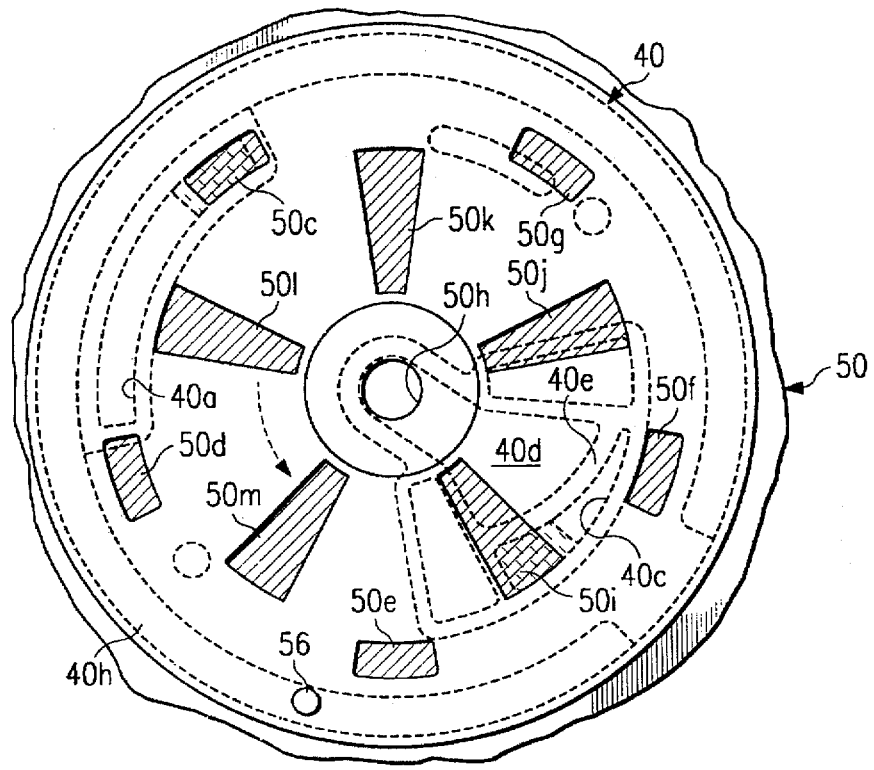

Assuming more vapor/air mixture flow is needed, as determined by the control unit 28 in the above manner, further rotation of the member 40 in a counterclockwise direction relative to the unit 50 continues until the member 40 reaches the position shown in FIG. 7. In this position maximum vapor/air mixture flow is achieved since the port 50c is still fully aligned with the slot 40a and since the slot 50i completely bypasses that portion of the ramp 40e extending between the slots 40c and 40d. Thus, the vapor/air mixture flows in the same manner as described in connection with the mode of FIG. 6, but at a higher rate. It is noted that the member 40 can rotate in both a clockwise direction relative to the unit 50 to decrease vapor/air mixture flow and, of course, in a counterclockwise direction to increase flow as determined by the control unit in the above manner.

Once the dispensing nozzle associated with the unit 20a is shut off by the operator, or automatically in response to the filling of the vehicle tank, but before the nozzle is returned to the dispenser housing associated with the unit 20a, the control unit 28 actuates the motor 32 to move the member 40 in a clockwise relation relative to the unit 50 until it returns to the standby mode between the positions of FIGS. 5 and 6. As discussed above, in this position the slot 50i is out of alignment with the slots 40c and 40d, as well as the ramp 40e, so that the latter ramp thus blocks the flow of any vapor/air mixture remaining in the assembly 22 from the slot 40c to the slot 40d. When the nozzle is then returned to the dispenser housing, an appropriate signal is then sent to the motor 32 from the control unit 28 which causes the motor to rotate the member 40 back to the starting position of FIG. 5 where it rests until another unit is actuated and the operation described above is repeated in connection with the particular unit 20a–20e that is actuated.

Of course, when another unit 20a–20e of the station 16a is later actuated, the member 40 is rotated to the position corresponding to the unit actuated. For example, if the nozzle associated with the unit 20b is removed from the dispenser housing, the member 40 would rotate to the position of FIG. 8, which is the standby position for unit 20b. In this position, the port 50d, corresponding to the unit 20b, is located in alignment with the slot 40a. The slot 50j, which also corresponds to the unit 20b, is located immediately adjacent the slots 40c and 40d and the ramp 40e extending between the latter slots. Upon actuation of the dispensing nozzle associated with the unit 20b, the operation of the assembly 22 then continues as described above in connection with the unit 20a.

Figure 8:
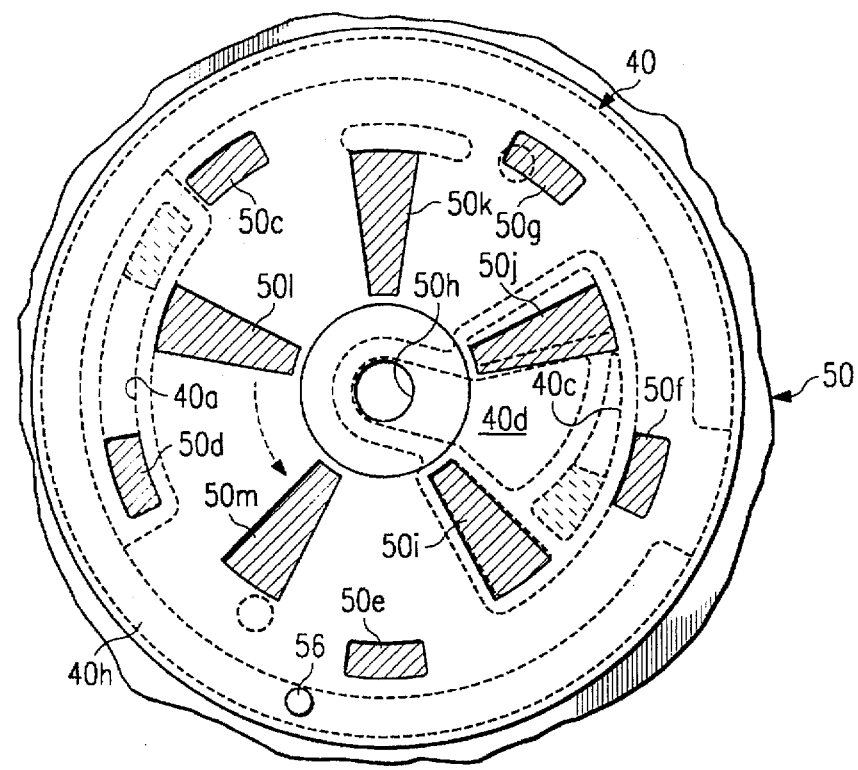

Once the dispensing nozzle associated with the unit 20b is shut off by the operator, or automatically in response to the filling of the vehicle tank, but before the nozzle is returned to the dispenser housing associated with the unit 20b, the control unit 28 actuates the motor 32 to move the member 40 in a clockwise relation relative to the unit 50 until the member 40 reaches the standby position shown in FIG. 8. In this position, the ramp 40e blocks the flow of any vapor/air mixture remaining in the assembly 22 as described above. When the nozzle is then returned to the dispenser housing, an appropriate signal is then sent to the motor 32 from the control unit 28 which causes the motor to rotate the member 40 back to the position of FIG. 5, which is the starting position for all of the units 20a–20e. The member 40 then rests in the position of FIG. 5 until another unit 20a–20e is actuated.

It is noted that when the member 40 is in the standby position of FIG. 8 after the dispensing unit associated with the unit 20b has been shut off as discussed above, if a dispensing unit associated with the station 16b is in use, the control unit 28 will not actuate the motor 32 to return the member 40 to the starting position of FIG. 5. Rather, the member 40 will remain in the standby position of FIG. 8 until the dispensing unit of the station 16b is put out of service or until another unit of the station 16a is actuated. This prevents the member 40 of the station 16a, during its return to the position of FIG. 5, from exposing the inlet port 50c to atmospheric air (through the various passages and slots in the members 40 and 50 discussed above) which air would be drawn into the apparatus by the pump 24, since the latter is actuated during the operation of a dispensing unit of the station 16b. This is also true with respect to the standby positions corresponding to the units 20c–20e.

During all of the above-described rotation of the member 40 relative to the unit 50, the pin 56 rides in the slot 40h with the ends of the latter slot serving as mechanical stops to establish limits for the rotation of the member 40, and, in addition, establishes the initial position of the member 40 relative to the unit 50 in the event of a power failure, an error signal, or the like.

Figure 9:
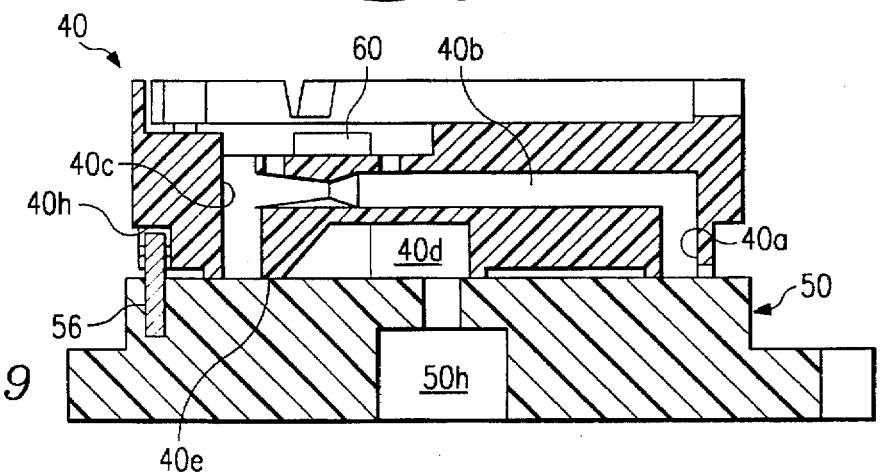
FIGS. 9 and 10 are sectional views of the meter valve assembly of FIG. 2.
Figure 10:
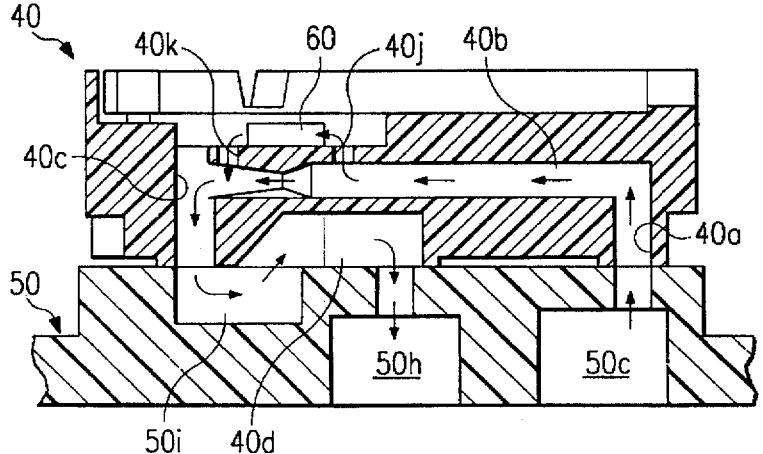

FIGS. 9 and 10 depict the structural relationship between the member 40 and the unit 50 in the fully closed position of FIG. 5 and the fully open position of FIG. 7, respectively, and more particularly the relationship between the various slots and openings in the units 40 and 50. In the fully blocked view of FIG. 9, the nonslotted surface of the unit 50 extends over the ramp 40e which thus prevents vapor/air mixture flow from the slot 40c to the slot 40d. Upon rotation of the member 40 to the fully open position of FIG. 10, the slot 50i connects the slots 40c and 40d and thus enables vapor/air mixture to flow over the ramp 40e, into and through the slot 40d and then exit the assembly 22, via the opening 50h.

In operation of the system and method of the present invention, the control unit 28 receives signals from the meter/valve assembly 22 that correspond to the amount of vapor/air mixture, as well as the vapor concentration in the mixture, emitting from the vehicle tank being filled, as well as signals from the assembly 22a that correspond to the amount of vapor/air mixture, and the vapor concentration in the mixture, emitting from the underground storage tank 10. When the underground storage tank 10 is not pressurized, i.e., there is no discharge through its vent pipe 10a, the control unit 28 adjusts the vapor flow from the vehicle tank to achieve the highest V/F ratio. When the tank 10 is pressurized and the mixture thus discharging from the vent pipe 10 has a relatively high vapor concentration, the pressure in the tank 10 should be reduced to eliminate the discharge of the gasoline vapor into the atmosphere. To this end, the control unit 28 is programmed to reduce the vapor recovered from the vehicle tanks, and therefore the above-mention V/F ratio, accordingly. If the tank 10 is pressurized, but the vapor concentration in the mixture exiting the vent pipe 10a is low or is pure air, as detected by the control unit 28 in the manner described above, the control unit is programmed to maintain the same V/F ratio and allow the tank to be vented.

Thus, the control unit 28 is programmed to respond to the various parameters and control the vapor recovery from the vehicle tanks as follows:

| Volumetric Flow Rate From Vent Pipe 10a | Vapor Concentration | Control Action |
| --- | --- | --- |
| Zero or negative | not applicable | Higher V/F |
| Positive | Zero or low | Maintain V/F |
| Positive | High | Lower V/F |

In this manner optimum (maximum) V/F ratios can be obtained while insuring that vapor discharge from the vent pipe 10a into the atmosphere is either nonexistent or minimal. Thus, the system of the present invention operates at increased efficiencies, minimizes pollution and eliminates hazardous conditions.

It is understood that variations may be made in the foregoing without departing from the scope of the invention. For example, the assembly 22a does not have to be connected to the control unit 28, but could be connected to a separate control unit that functions in the above-described manner.

Also, the present invention is not limited to the use of a valve unit as discussed above, but is equally adaptable to any flow-varying device such as a variable speed pump, an adjustable nozzle, etc. Also, rather than use the above-described jet oscillator in the unit 60, a separate differential pressure transducer may be located in parallel with the flow metering unit 60 that produces a signal proportional to the pressure drop over the flow metering unit 60 and the venturi unit 40i. The advantage of this is the pressure drop external to the oscillator is static and therefore, more accurate than the oscillating pressure drop sensed by the flow metering unit itself, as described above.

Also, rather than capture samples of ambient air in the vicinity of the unit and then calculate the density of the air sample, as described above, the air density can also be set at a predetermined value.

Further, rather than designing the control unit 28 so that it performs the above-mentioned measurements and calculations and produces an additional output signal corresponding to the density, or amount, of gasoline vapor in the vapor/air mixture, the electronics in the member 40 can be adapted to do so. In this case, the output signal would be sent, via the cable 42, to the control unit 28 along with the signal corresponding to the volumetric flow of the mixture as described above. The control unit 28 would receive these signals from the assembly 22 as well as a signal from the gasoline flow meter 18, which is proportional to the gasoline flow through the actuated unit.

Also, the present invention is not limited to the particular disclosed technique of detecting the density of the hyrocarbon vapors in the air/vapor mixture recovered from the vehicle tank and vented from the storage tank 10. Rather, the flow metering unit 60 could be used only to measure the flow of the mixture and a separate unit could be used to detect the density, or amount, of the vapors in the mixture.

Still further, instead of one hose and nozzle assembly being associated with each dispensing unit 20a–20d as described above, a single hose and nozzle assembly can be provided with each dispensing station 16a and 16b along with valving to blend the gasoline from multiple storage tanks (if provided) and selectively direct the particular gasoline formulation to the single hose and nozzle dispenser. In this arrangement, the above-mentioned microprocessor would operate the assembly 22 in a manner so that only one of the inlet ports 50c–50g would be functional. Also, the present invention is not limited to the particular flowmeter discussed above, but can also utilize other flowmeters, such as, for example, a flowmeter manufactured and distributed by the Moore Products Co., of Springhouse, Pa.

Further modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A vapor recovery system for recovering vapors from a vehicle tank, the system comprising a storage tank, a vapor flow system connecting the vehicle tank to the storage tank for passing a mixture of air and gasoline vapors in the vehicle tank to the storage tank, a device for varying the flow of the mixture from the vehicle tank to the storage tank, a vent pipe extending from the storage tank for venting a mixture of air and gasoline vapors from the storage tank, a flowmeter for measuring the flow of the mixture from the vent pipe, and a control unit operatively connected to the flowmeter and to the flow-varying device for responding to the amount of the mixture flow from the vent pipe and for adjusting the flow-varying device, and therefore the flow of the mixture from the vehicle tank, accordingly.

2. The system of claim 1 wherein the flow-varying device varies the flow of the mixture from the vehicle tank to the storage tank in response to the receipt of input signals, and wherein the control unit generates the input signals in response to the mixture flow from the vent pipe measured by the flowmeter.

3. The system of claim 1 further comprising a detector for detecting the amount of vapor in the mixture, the control unit also responding to the amount of vapor in the mixture and adjusting the flow-varying device accordingly.

4. The system of claim 1 wherein the flowmeter also measures the pressure drop of the mixture from the vent pipe, and wherein the control unit determines the amount of vapor in the mixture based on the pressure drop and adjusts the flow-varying device accordingly.

5. The system of claim 1 wherein the vapor flow system passes the mixture from the vehicle tank to the storage tank during dispensing of the gasoline from the storage tank to the vehicle tank.

6. The system of claim 5 further comprising a flowmeter operatively connected to the control unit for measuring the flow of the gasoline from the storage tank to the vehicle tank, the control unit also adjusting the flow-varying device in response to the latter flow of gasoline into the vehicle tank.

7. The system of claim 1 wherein the control unit adjusts the flow-varying device in response to the amount of gasoline vapor in the mixture flow from the vent pipe exceeding a predetermined value.

8. The system of claim 1 further comprising a flowmeter operatively connected to the vapor flow system for measuring the flow of the mixture from the vehicle tank to the storage tank, the control unit also adjusting the flow-varying device in response to the latter flow.

9. The system of claim 8 further comprising a detector for detecting the amount of vapor in the mixture flowing from the vehicle tank to the storage tank, the control unit also responding to the amount of vapor in the latter mixture and adjusting the flow-varying device accordingly.

10. The system of claim 9 wherein the control unit responds to the amount of gasoline vapor in the latter mixture falling below a predetermined value and adjusts the flow-varying device to terminate the flow of the mixture from the tank.

11. A vapor recovery method comprising the steps of passing a mixture of air and gasoline vapor from a vehicle tank to a storage tank, venting a portion of the mixture of air and gasoline vapor from the storage tank, measuring the flow of the vented mixture from the storage tank, responding to the amount of the mixture flow from the storage tank and varying the mixture flow from the vehicle tank accordingly, and detecting the amount of gasoline vapor in the mixture flow from the vehicle tank and varying the mixture flow from the vehicle tank accordingly.

12. The method of claim 11 further comprising the steps of detecting the vapor concentration of the vented mixture, and varying the mixture flow from the vehicle tank accordingly.

13. The method of claim 11 wherein the step of passing is during dispensing of gasoline from the storage tank to the vehicle.

14. The method of claim 11 further comprising the step of terminating the mixture flow from the vehicle tank in response to the amount of gasoline vapor in the mixture flow from the vehicle tank falling below a predetermined value.

15. The method of claim 13 further comprising the step of measuring the flow of the gasoline from the storage tank to the vehicle tank and varying the mixture flow from the vehicle tank accordingly.

16. A vapor recovery method comprising the steps of passing a mixture of air and gasoline vapor from a vehicle tank to a storage tank, venting a portion of the mixture of air and gasoline vapor from the storage tank, detecting the amount of vapor in the vented mixture from the storage tank, responding to the amount of vapor in the vented mixture and varying the mixture flow from the vehicle tank accordingly, and measuring the flow of the gasoline from the storage tank to the vehicle tank and varying the mixture flow from the vehicle tank accordingly.

17. The method of claim 16 wherein the step of passing is during dispensing of gasoline from the storage tank to the vehicle.

18. The method of claim 16 further comprising the step of measuring the flow of the mixture from the vehicle tank to the storage tank, and varying the mixture flow from the vehicle tank accordingly.

19. The method of claim 16 wherein the step of responding responds to the amount of gasoline vapor in the mixture flow from the vent pipe exceeding a predetermined amount.

20. The method of claim 18 further comprising the steps of detecting the amount of gasoline vapor in the mixture flow from the vehicle tank and varying the mixture flow from the vehicle tank accordingly.

21. The method of claim 18 further comprising the step of terminating the mixture flow from the vehicle tank in response to the amount of gasoline vapor in the mixture flow from the vehicle tank falling below a predetermined value.

22. A vapor recovery method comprising the steps of passing a mixture of air and gasoline vapor from a vehicle tank to a storage tank, venting a portion of the mixture of air and gasoline vapor from the storage tank, detecting the amount of vapor in the vented mixture from the storage tank, responding to the amount of vapor in the vented mixture and varying the mixture flow from the vehicle tank accordingly, and measuring the flow of the mixture from the vehicle tank to the storage tank, and varying the mixture flow from the vehicle tank accordingly.

23. The method of claim 22 wherein the step of passing is during dispensing of gasoline from the storage tank to the vehicle.

24. The method of claim 22 further comprising the step of measuring the flow of the gasoline from the storage tank to the vehicle tank and varying the mixture flow from the vehicle tank accordingly.

25. The method of claim 22 further comprising the steps of detecting the amount of gasoline vapor in the mixture flow from the vehicle tank and varying the mixture flow from the vehicle tank accordingly.

26. The method of claim 22 further comprising the step of terminating the mixture flow from the vehicle tank in response to the amount of gasoline vapor in the mixture flow from the vehicle tank falling below a predetermined value.

27. The method of claim 22 wherein the step of responding responds to the amount of gasoline vapor in the mixture flow from the vent pipe exceeding a predetermined amount.

* * * * *